United States Patent
Lee et al.

(10) Patent No.: US 9,541,689 B2
(45) Date of Patent: Jan. 10, 2017

(54) MULTILAYER OPTICAL FILM HAVING HIGH HEAT RESISTANCE AND METHOD FOR MANUFACTURING THE SAME

(71) Applicant: LG Hausys, Ltd., Seoul (KR)

(72) Inventors: Eung Kee Lee, Anyang-si (KR); Min Hee Lee, Gunpo-si (KR); Chang Hak Shin, Seoul (KR); Ku Il Park, Yongin-si (KR)

(73) Assignee: LG HAUSYS, LTD., Seoul (KR)

( * ) Notice: Subject to any disclaimer, the term of this patent is extended or adjusted under 35 U.S.C. 154(b) by 50 days.

(21) Appl. No.: 14/375,588

(22) PCT Filed: Dec. 27, 2012

(86) PCT No.: PCT/KR2012/011526
§ 371 (c)(1),
(2) Date: Jul. 30, 2014

(87) PCT Pub. No.: WO2013/125781
PCT Pub. Date: Aug. 29, 2013

(65) Prior Publication Data
US 2015/0002935 A1    Jan. 1, 2015

(30) Foreign Application Priority Data
Feb. 20, 2012 (KR) .................. 10-2012-0017048

(51) Int. Cl.
*G02B 5/30* (2006.01)
*B32B 27/08* (2006.01)
(Continued)

(52) U.S. Cl.
CPC ............... *G02B 5/305* (2013.01); *B32B 27/08* (2013.01); *B32B 27/36* (2013.01); *B32B 37/14* (2013.01);
(Continued)

(58) Field of Classification Search
CPC combination set(s) only.
See application file for complete search history.

(56) References Cited

U.S. PATENT DOCUMENTS 5,049,927 A * 9/1991 Tsushima ............... G03C 1/733
355/132
5,804,626 A * 9/1998 Rogers .................... C08L 67/02
524/195

(Continued)

FOREIGN PATENT DOCUMENTS

CN          1320219 A    10/2001
CN        102216819 A    10/2011
(Continued)

OTHER PUBLICATIONS

Chelseacook, "Heat shrinkable polyester plastic film processing and application", Jan. 17, 2011, Alibaba.com.*
(Continued)

*Primary Examiner* — Bumsuk Won
*Assistant Examiner* — Balram Parbadia
(74) *Attorney, Agent, or Firm* — Hauptman Ham, LLP

(57) ABSTRACT

Disclosed is a multilayer optical film having a structure in which a first resin layer and a second resin layer are alternately laminated, wherein the first resin layer comprises a crystalline naphthalene dicarboxylic-acid polyester and the second resin layer comprises polyethylene terephthalate glycol (PETG). Also disclosed is a method for manufacturing a multilayer optical film comprising (a) melting extrusion a first resin comprising a crystalline naphthalene dicarboxylic-acid polyester and a second resin comprising PETG respectively and then alternately laminating the first resin and the second resin; and (b) elongating the laminated sheet in step (a) and then thermosetting them.

12 Claims, 1 Drawing Sheet

(51) Int. Cl.
  *B32B 37/14* (2006.01)
  *B32B 38/00* (2006.01)
  *G02B 1/04* (2006.01)
  *B32B 27/36* (2006.01)
(52) U.S. Cl.
  CPC ............ *B32B 38/0012* (2013.01); *G02B 1/04* (2013.01); *G02B 5/3083* (2013.01); *B32B 2038/0028* (2013.01); *B32B 2307/70* (2013.01); *B32B 2551/00* (2013.01)

(56) References Cited

U.S. PATENT DOCUMENTS

| | | | | |
|---|---|---|---|---|
| 5,859,116 | A * | 1/1999 | Shih | C08J 5/18 524/493 |
| 6,045,894 | A | 4/2000 | Jonza et al. | |
| 6,120,026 | A * | 9/2000 | Whitney | A63F 3/00643 273/236 |
| 6,433,081 | B1 * | 8/2002 | Tokunaga | B32B 27/36 525/63 |
| 2005/0187344 | A1 | 8/2005 | Wilkey | C08F 297/04 525/88 |
| 2005/0259326 | A1 | 11/2005 | Weber et al. | |
| 2006/0089457 | A1 * | 4/2006 | Hartsock | C08F 297/04 525/88 |
| 2006/0093846 | A1 * | 5/2006 | Chien | B32B 3/30 428/520 |
| 2006/0094858 | A1 * | 5/2006 | Turner | C08G 63/199 528/272 |
| 2006/0103810 | A1 * | 5/2006 | Ma | G02B 27/1026 353/20 |
| 2006/0221446 | A1 | 10/2006 | Hebrink et al. | |
| 2007/0052131 | A1 * | 3/2007 | Fujimaki | C08G 59/42 264/210.7 |
| 2007/0202337 | A1 * | 8/2007 | Lischefski | B32B 27/08 428/411.1 |
| 2007/0232778 | A1 * | 10/2007 | Moody | C08G 63/199 528/272 |
| 2007/0232779 | A1 * | 10/2007 | Moody | B32B 27/08 528/272 |
| 2007/0259142 | A1 * | 11/2007 | Lischefski | B32B 27/08 428/35.7 |
| 2008/0145666 | A1 | 6/2008 | Hebrink et al. | |
| 2009/0047522 | A1 | 2/2009 | Yu et al. | |
| 2010/0010169 | A1 * | 1/2010 | Tsai | C08L 67/02 525/419 |
| 2012/0128931 | A1 * | 5/2012 | Kim | C08J 5/18 428/141 |
| 2012/0164419 | A1 * | 6/2012 | Sakagami | B32B 27/08 428/216 |
| 2012/0187672 | A1 * | 7/2012 | Sakagami | B32B 27/02 281/38 |
| 2012/0207993 | A1 * | 8/2012 | Joo | B32B 27/08 428/216 |

FOREIGN PATENT DOCUMENTS

| | | |
|---|---|---|
| JP | 2002521730 A | 7/2002 |
| JP | 2006512619 A | 4/2006 |
| JP | 2008500211 A | 1/2008 |
| JP | 2008517139 A | 5/2008 |
| JP | 2008528313 A | 7/2008 |
| JP | 2008546866 A | 12/2008 |
| KR | 100364029 B1 | 10/2003 |
| KR | 100560342 B1 | 3/2006 |
| KR | 100728091 B1 | 6/2007 |
| KR | 100884917 B1 | 2/2009 |
| TW | 200831289 A | 8/2008 |
| WO | 0007046 A1 | 2/2000 |

OTHER PUBLICATIONS

Robert D. Leaversuch, "Thermoplastic Polyesters: It's a Good Time to Know them Better", Jun. 2004, Plastics Technology.*
Chinese Office Action dated May 11, 2015.
International Search Report for PCT/KR2012/011526 mailed on Apr. 23, 2013.
Japanese Office Action corresponding to Application No. 2014-556466 dated Oct. 2, 2015.
Japanese Notice of Allowance dated on May 13, 2016 corresponding to Japanese Application No. 2014-556466.

* cited by examiner

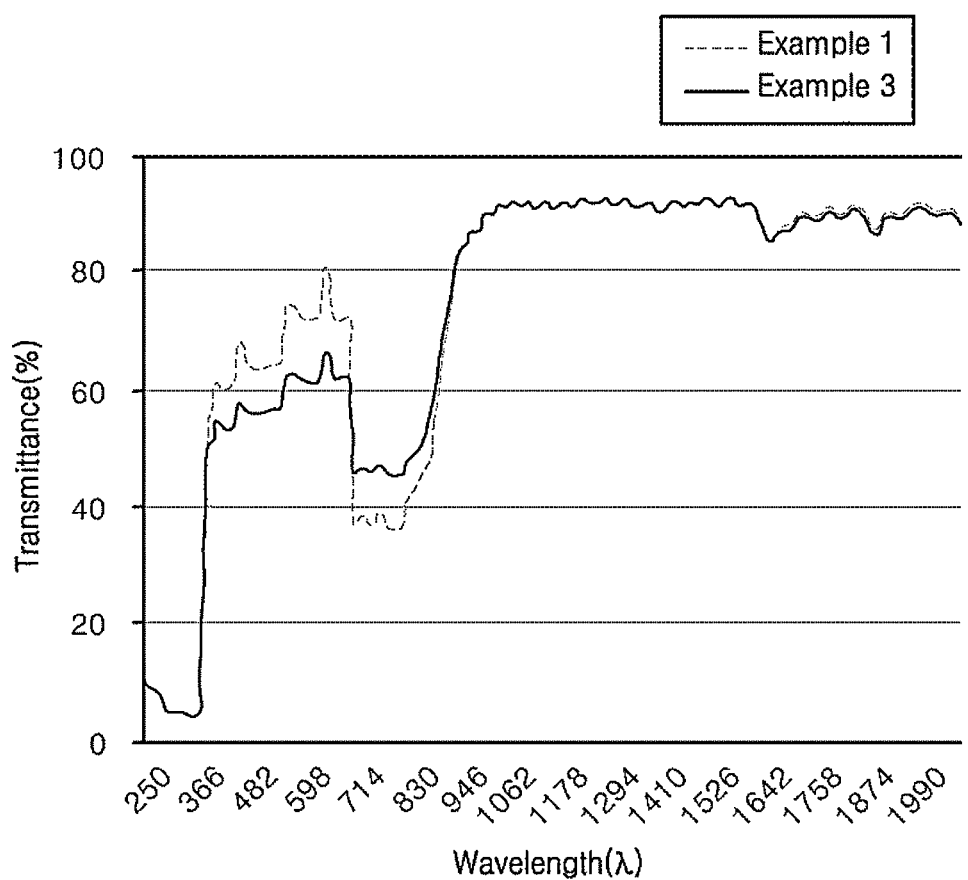

MULTILAYER OPTICAL FILM HAVING HIGH HEAT RESISTANCE AND METHOD FOR MANUFACTURING THE SAME

CROSS REFERENCE TO RELATED APPLICATION

This application claims the priority of KR Patent Application No. 10-2012-0017048 filed on Feb. 20, 2012 in the Korean Patent and Trademark Office. Further, this application is the National Phase application of International Application No. PCT/KR2012/011526 filed on Dec. 27, 2012, which is incorporated herein by reference in its entirety.

TECHNICAL FIELD

The present invention relates to a multilayer optical film having high heat resistance and a method for manufacturing the same, and more particularly, a multilayer optical film having a structure in which a first resin layer and a second resin layer are alternately laminated, wherein the first resin layer comprises a crystalline naphthalene dicarboxylic-acid polyester and the second resin layer comprises polyethylene terephthalate glycol (PETG) is provided.

BACKGROUND ART

Prior multilayer optical films use alternate layers of a polymer based a crystalline polyester and another polymer. This uses a phenomenon in which rays are reflected through a constructive interference generated at an interface of materials having different refractive indexes with each other. Especially, among multilayer optical films, polyester is used as a useful material for a first component of a polarizer film, and this is because it has high double refractive index in the case of a naphthalene dicarboxylate polyester among polyesters. In addition, the characteristics of the polymer based polyester are determined by monomer materials used during manufacturing the polymers, and therefore, there are advantages of being able to easily adjust the refractive index. Also, when compatibility of a second component with the first component drops, peeling off of films may occur, but this is because a variety of copolymerization of the polymer based polyester is possible, and selecting a material that may satisfy optical characteristics while preventing peeling off of the first component and the second component is easily carried out.

Likewise, regarding the multilayer optical films, until now, development of simplification of methods for manufacturing the multilayer optical films and improvement of optical characteristics of materials have been carried out, and also in Korea patent registration No. 10-0364029, regarding a multilayer polymer film comprising multiple alternate layer agents of crystalline naphthalene dicarboxylate ester and another selected polymer is disclosed. But, different from before, along with recent trends of slimness of display devices, problems of heat generating from devices are becoming issues, and importance of developing materials having stability is coming to the fore.

DISCLOSURE

Technical Problem

An objective of the present invention is to solve heat resistance problems of display materials due to problems of heat in display devices, and to provide a multilayer optical film using materials with improved heat resistance.

Another objective of the present invention is to provide a method for manufacturing a multilayer optical film having excellent reflection and strong heat resistance through an organic material having excellent heat resistance.

Technical Solution

To achieve the above described objective, the present invention provides a multilayer optical film having a structure in which a first resin layer and a second resin layer are alternately laminated, wherein the first resin layer comprises a crystalline naphthalene dicarboxylic-acid polyester and the second resin layer comprises polyethylene terephthalate glycol (PETG) is provided Also, to achieve the objective of the present invention, the present invention provides a method for manufacturing a multilayer optical film comprising the step of; (a) melting extrusion a first resin layer comprising a crystalline naphthalene dicarboxylic-acid polyester and a second resin layer comprising polyethylene terephthalate glycol (PETG) respectively and then alternately laminating the first resin and the second resin; and (b) elongating the laminated sheet in step (a) and then thermosetting them.

Advantageous Effects

A multilayer optical film of the present invention, by having a second resin layer comprising polyethylene terephthalate glycol (PETG) having a constant glass transition temperature, heat resistance is improved, and optical characteristics are excellent since high refractive index difference may be generated with the first resin layer.

Also, the multilayer optical film having excellent heat resistance may be provided through a method for manufacturing a multilayer optical film.

DESCRIPTION OF DRAWINGS

FIG. 1 is a graph showing test results of optical characteristics of Example 1 and Example 2.

BEST MODE

Advantages and features of the present invention, and method for achieving thereof will be apparent with reference to the following examples. But, it should be understood that the present invention is not limited to the following examples and may be embodied in different ways, and that the examples are given to provide complete disclosure of the invention and to provide thorough understanding of the invention to those skilled in the art, and the scope of the invention is limited only by the accompanying claims and equivalents thereof. Like components will be denoted by like reference numerals throughout the specification.

Hereinafter, the present invention is described in detail.
Multilayer Optical Film The present invention provides a multilayer optical film having a structure in which a first resin layer and a second resin layer are alternately laminated, wherein the first resin layer comprises a crystalline naphthalene dicarboxylic-acid polyester and the second resin layer comprises polyethylene terephthalate glycol (PETG).

The first resin layer has a crystalline naphthalene dicarboxylic-acid polyester as a main component, and the crystalline naphthalene dicarboxylic-acid polyester is polyethylenenaphthalate (PEN). The PEN may use a component manufactured by polycondensation of naphthalatedicarboxylic-acid and ethyleneglycol. Furthermore, the PEN comprised in the first resin layer has a high double refractive index, and excellent heat resistance.

The second resin layer comprises polyethylene terephthalate glycol (PETG). The PETG such as the following [Chemical formula 1] may use a component manufactured from ethylene glycol (EG), 1,4-cyclohexanedimethanol (CHDM), and terephthalic acid (TPA), and has isotropy.

of the multilayer optical film, and because it has relations with aspects of structural stability, in which layers are made to be combined or not to be split asymmetrically, structural stability of amorphous polymers may drop as difference of the glass transfer temperature of the first resin layer and the second resin layer becomes greater with respect to the elongation process. Therefore, in the present invention, by using a resin comprising the PETG having a high temperature glass transfer temperature, the difference of the glass

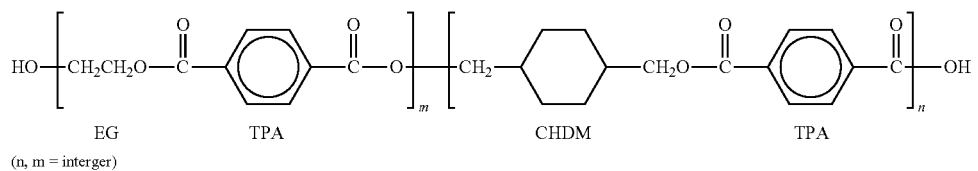

[Chemical formula 1]

Since the polyethylene terephthalate glycol (PETG) is used mostly for extrusion molding, a high molecular weight polymer should be manufactured since high melt viscosity is required, but due to its non-crystalline resin characteristics, solid-state polymerization may not be used, and thus technology with a high level of difficulty is required that simultaneously satisfies bright colors and excellent transparency suitable for end use while reacting to high molecular weights only with melt polycondensation.

Also, the second resin layer has a glass transfer temperature of 100 to 140° C. When the glass transfer temperature is less than 100° C., there are concerns of drop in structural stability in an elongation process step due to the drop in heat resistance, and when over 140° C., there are problems that flame resistance may drop by influencing the heat resistance of the final multilayer optical film.

When using the PETG having glass transfer temperatures in the level of 100 to 140° C. as in the present invention, compared to using the PETG in the level of 80 to 90° C., the heat resistance problem, which was difficult to overcome with only the first resin layer comprising the PEN, may be solved by having high heat resistance.

The PETG resin has an amount of cyclohexanedimethanol (CHDM) of 50% or over. When the amount of the cyclohexanedimethanol is contained less than 50%, only the prior PETG having a glass transfer temperature of about 80 to 90° C. may be obtained, and a normal PETG having a glass transfer temperature of about 80 to 90° C. generally has the amount of cyclohexanedimethanol in the level of 25%.

But when the amount of cyclohexanedimethanol is 50% or over, a high thermal resistant PETG having a glass transfer temperature of 100 to 140° C. may be obtained. More preferably, the PETG for manufacturing the high thermal resistant film may solve heat resistance problems by using by increasing the amount of cyclohexanedimethanol to 60 to 70%.

When using over 70% of cyclohexanedimethanol, the PETG, which is a non-crystalline resin, becomes crystalline and loses the non-crystalline characteristics of the PETG, so by containing at least 50%, preferably 60 to 70% of cyclohexanedimethanol, a high heat resistant PETG having a glass transfer temperature of 100 to 140° C. while maintaining non-crystalline resin characteristics may be obtained.

Also, since the glass transfer temperature of the alternately repeating materials determines the final performance transfer temperature with the first resin layer becomes smaller, and thus may show excellent effects in structural stability.

The first resin layer and the second resin layer comprised in the present invention has a refractive index difference of less than 0.2, and especially the refractive index difference is preferably 0.05-0.2. The multilayer optical film of the present invention, since it is important to increase reflection ratios of light at its interface by alternately arranging resin layers with different refractive index with each other, when the refractive index difference is less than 0.5, has concerns of the final product having no product value as a multilayer optical film because the transmittance at the interface becomes higher than the reflection ratio.

The difference of the refractive index of each resin layer is an important number with respect to determining the efficiency of the multilayer optical film. Until now, a resin layer comprising polyethylene terephthalate glycol (PETG) having no excellence in heat resistance was not used, but since the glass transfer temperature of the second resin layer comprising polyethylene terephthalateglycol (PETG) in the present invention is 100 to 140° C., disadvantages of heat resistance is overcame, and by comprising a laminated structure with the first resin layer comprising polyethylenenaphthalate (PEN) having a relatively higher refractive index than the refractive ratio of polyethylene terephthalateglycol (PETG), characteristics of the multilayer optical film may be greatly improved.

Furthermore, the thickness of the first resin layer and the second resin layer may be 100 to 500 nm, and especially, comprising the thickness of 200 to 300 nm is preferable in that light in a visible ray range may be adjusted. The thickness of each resin layer determines the wavelength range of the transmitting light, and more specifically, the wavelength range of the light may be determined from the refractive index of each layer with respect to the thickness of each layer. When the thickness of the first resin layer and the second resin layer is less than 100 nm, there are concerns of the adjusting wavelength band changing to a short wavelength band, and when over 500 nm, there are problems of the adjusting wavelength band changing to an infrared range.

Adding conventional additives, for example a polycondensation catalyst, a dispersant, a static applying agent, an anti-static agent, a UV blocking agent, a blocking preventing agent and other inorganic lubricants are permissible when within a range of not damaging the effects of the present invention.

The multilayer optical film of the present invention manufactured as described above may be used in a variety of uses of mirror films, color filters, packing materials, optical windows, etc. In the case of color filters, it may be used for interior decoration, etc. since a specific color may be shown semi-permanently by reflecting desired lights.

Method for Manufacturing Multilayer Optical Film

The present invention provides a method for manufacturing a multilayer optical film comprising the step of: (a) melting extrusion a first resin comprising a crystalline naphthalene dicarboxylic-acid polyester and a second resin comprising PETG respectively and then alternately laminating the first resin and the second resin; and (b) elongating the laminated sheet in step (a) and then thermosetting them.

In the step (a), a process of simultaneous melted extruding a first resin and a second resin through an extruder is performed. The melted extruding temperature is preferably to be 280° C. or more, and is further preferable to be 280 to 300° C. in that non-melted pellets in the film may be reduced.

The melted extruded first resin and the second resin is laminated through a multilayer feed block. It is preferable for the temperature of the feed block to not deviate from the melted extruding temperature, and is preferably performed at 280° C. or over. The number of laminations are adjusted in accordance with location of waves, reflection ratio, or thickness of the film, and may be laminated as few as 50 layers to as many as at least 1,000 layers. As the number of lamination layers increases the reflection ratio with respect to a specific wavelength increases, when a gradient is given, the range of the reflecting wavelength may be widened. Also, changing the location of the wave in accordance with the thickness of each layer is possible, and changing the thickness of the most outer layer is also possible according to needs. Especially, properly maintaining the flow ratio through the extrusion ratio helps manufacturing a film having an appearance that does not flow.

In the step (b), the laminated sheet may be elongated in at least one direction among a longitudinal direction or a vertical direction. More particularly, the laminated body formed through the multilayer feed block goes through the elongation in at least one direction among a longitudinal direction or a vertical direction after casting, and the difference of the refractive ratio becomes greater from this. When one axis elongation in a longitudinal direction or a vertical direction is performed, the manufactured optical filter may have characteristics of separating and transmitting/reflecting light by manifesting only a portion of the double refractivity. Quickly cooling by utilizing an airknife, etc. during casting is preferable, and this helps for the first resin and the second resin to not mix and to maintain each unique refractive index.

To maximize the optical/physical characteristics of the polyethylene terephthalate glycol (PETG), performing an oriented elongation in as low temperature as possible is preferable, and performing at temperatures of glass transfer temperature (Tg)+30° C. or less of the polyethylene terephthalate glycol (PETG), and preferably at temperatures of glass transfer temperature (Tg)+10° C. or less of the polyethylene terephthalate glycol (PETG) is desirable. For example, the elongation process of the multilayer film of the present invention may be performed at elongation temperatures of 150 to 180° C. When the temperature during the elongation is less than 150° C., there are concerns of fracturing of the multilayer optical film, when exceeding 180° C., there are problems of internal structure of the film becoming unstable. Also, after passing through the elongation process in the step (b), the difference of the refractive index of the first resin layer and the second resin layer in the elongation direction is greater than the difference of the refractive index of the first resin layer and the second resin layer in the non-elongation direction. The polyethylene terephthalate glycol (PETG) comprised in the second resin layer is non-crystalline and is an isotropic polymer resin maintaining its low refractive index regardless of elongation. But, the refractive index of the first resin layer increases after elongation compared to before elongation, and this is because, different from the PETG comprised in the second resin layer, the naphthalate group existing in the PEN comprised in the first resin layer is rearranged in accordance with the film elongation.

More particularly, after elongation, the difference of the refractive index between the first resin layer and the second resin layer in the elongation direction further increases to 0.3 or more, and different from prior methods, disturbance of elongation and increase in haze from crystallization practically does not occur. All of the values of haze of each resin layer are preferably to be maintained to 0.5 to 0.7%, which is 1 or less.

Hereinafter, the present invention is described in further detail from the following examples. But, the following examples are provided to exemplify the present invention and the scope of the present invention is not limited to these examples.

EXAMPLES AND COMPARATIVE EXAMPLES

Manufacturing a Multilayer Optical Film

Example 1

PEN:PETG

A 1,000 layer film composed of a PEN and a high thermal resistant PETG was manufactured through a T-Die extrusion using a coextrusion multiplication technology utilizing a feed block. The high thermal resistant PETG is a polymer having Tg of 120° C., and a surface layer was composed of the PEN. The manufactured film was pre-heated for 1 minute at 160° C., the elongation ratio was made to 6:1 at 150° C., and the elongation direction was in a machine direction (MD).

Example 2

PEN:PETG

A 1,000 layer film was manufactured in the same manner as in Example 1, except for the high heat resistance of PETG having Tg of 140° C.

Example 3

PEN:PETG

A 1,000 layer film composed of a PEN and a PETG was manufactured through a T-Die extrusion using a coextrusion multiplication technology utilizing a feed block. The PETG is a polymer having Tg of 80° C., and a surface layer was composed of the PETG. The manufactured film was pre-heated for 1 minute at 160° C., the elongation ratio was made to 6:1 at 150° C., and the elongation direction was in a machine direction (MD).

Example 4

PEN:PETG

A 1,000 layer film was manufactured in the same manner as in Example 1, except for the high heat resistance of PETG having Tg of 100° C.

Comparative Example 1

An individual PEN polymer was manufactured through extrusion.

Comparative Example 2

An individual high thermal resistant PETG polymer (glass transfer temperature of 120° C.) was manufactured through extrusion.

Comparative Example 3

An individual PETG polymer (glass transfer temperature of 80° C.) was manufactured through extrusion.
Flame Resistance and Optical Characteristics Evaluation The evaluation of flame resistance of the present experimental example was performed using a method in which one specimen was laid horizontally and fire was lit, that is, using a horizontal burning test.

The optical film of the Examples 1 to 4 and Comparative examples 1 to 3 was manufactured into a specimen having a length of 5 in. (127 mm), a width of 0.5 in (12.7 mm), and a thickness of 0.12 to 0.5 in, (3.05 to 12.7 mm), and flame was applied in a horizontal direction on the specimen, and the length of the flame was 2 cm, and a blue flame having a flame color of no reddish color was used. Here, applying of the flame was performed continuously. Here, the flame resistance of the multilayer optical film of the Examples 1 to 4 and Comparative examples 1 to 3 were measured and its results are shown in the following Table 1.

Also, optical characteristics were measured and their results are shown in FIG. 1. To observe the transmittance of each wavelength, a spectrophotometer (Shimadzu, solid spec 3700) was used, and the optical characteristics were measured.

TABLE 1

| | Soot generation time(sec) | Burn start time(sec) | Complete burn time(sec) |
|---|---|---|---|
| Example 1 | 30 | 60 | 180 |
| Example 2 | 30 | 55 | 185 |
| Example 3 | 10 | 50 | 120 |
| Example 4 | 20 | 30 | 100 |
| Example 1 | 30 | 30 | 60 |
| Comparative example 2 | 30 | 30 | 50 |
| Comparative example 3 | 5 | 20 | 40 |

As can be seen in the Table 1, the burn start time (the time burn starts for the first time) of Examples 1 to 4 was measured to be later than Comparative examples 1 to 3. As complete burn time of Examples 1 to 4 was measured to take longer than Comparative examples 1 to 3, by laminating the second resin layer comprising the first resin layer and the PETG, the heat resistance of the optical film was observed to be more excellent. Furthermore, from the results of the flame resistance test of Example 1, the optical film applying the second resin layer comprising the high thermal resistant PETG having high glass transfer temperatures compared to the second resin layer comprising the normal PETG was observed to be excellent.

FIG. 1 shows the transmittance corresponding to constant wavelengths of Examples 1 and 3, and the transmittance maintains at 90% or over and there are no differences in infrared ranges exceeding 1,000λ, but shows optical characteristics of the transmittance dropping and rising in visible ray ranges of 250 to 1,000λ. Even though not illustrated, this is similar to the optical characteristics of the multilayer optical film, in which the resin layer comprising the PET and the resin layer comprising the PEN is alternately laminated, and the optical characteristics of the Examples 1 to 3 were verified.

Refractive Index Measurement and Evaluation

With respect to the Examples 1 to 3 and the Comparative examples 1 to 3, the refractive index before elongation and after elongation at 632.8 nm was measured using an Abbe refractometer, and the results are summarized in the Table 2 below. The refractive index after elongation was measured by distinguishing the elongation direction and the non-elongation direction.

TABLE 2

| | | Example 1 | Example 3 | Comparative example 1 | Comparative example 2 | Comparative example 3 |
|---|---|---|---|---|---|---|
| Refractive index of first resin layer | Before elongation | 1.64 | 1.64 | 1.64 | — | — |
| | After elongation (Elongation direction) | 1.88 | 1.89 | 1.62 | — | — |
| | After elongation (Non-elongation direction) | 1.64 | 1.65 | 1.61 | — | — |
| Refractive index of second resin layer | Before elongation | 1.56 | 1.54 | — | 1.56 | 1.54 |
| | After elongation (Elongation direction) | 1.56 | 1.53 | — | 1.55 | 1.54 |
| | After elongation (Non-elongation direction) | 1.56 | 1.53 | — | 1.55 | 1.54 |

Referring to the Table 2, the difference of the refractive index between the first resin layer and the second resin layer of the multilayer optical film of the Examples 1 to 3 in accordance with the present invention becomes greater to 0.32, 0.36 compared to the refractive index between the first resin layer and the second resin layer of 0.08, 0.12 after elongation.

The difference of the refractive index between layers occurs by passing through the elongation step as such, and the effects of constructive interference occurring due to the refractive index differences may become greater. Also, more excellent optical characteristics being able to be realized may be predicted by being able to increase the optical characteristics, that is, the reflective ratio of light.

Heat Resistance Evaluation

With respect to the Examples 1 to 4 and the Comparative examples 1 to 3, heat resistance evaluation was performed by manufacturing a film specimen of length of 100 mm, width of 100 mm, and thickness of 0.5 mm, left alone in a oven of 60° C. and 90° C. for 12 hours to 72 hours, and through dimensional stress, and the results are shown in Table 3. Here, heat resistance shows excellence as stress (%) becomes smaller.

TABLE 3

|  | Left alone (60° C.) | | Left alone (60° C.) | |
| --- | --- | --- | --- | --- |
|  | After 12 hours | After 72 hours | After 12 hours | After 72 hours |
| Example 1 | 0.7% | 1% | 1.3% | 1.8% |
| Example 2 | 0.7% | 1% | 1.2% | 1.9% |
| Example 3 | 0.5% | 0.8% | 4.1% | 5.8% |
| Example 4 | 0.7% | 1% | 2.5% | 2.7% |
| Comparative example 1 | 0.9% | 1.3% | 5% | 8% |
| Comparative example 2 | 1% | 1.7% | 6% | 10% |
| Comparative example 3 | 1% | 1.9% | 11% | 15% |

The glass transfer temperature of the normal, not the high thermal resistant, PETG maintains 80 to 90° C., and since 60° C. is lower than the glass transfer temperature of the normal PETG, all of the dimensional stress was measured low for the Examples 1, 2, and 4, in which the optical films are manufactured by alternately laminating high thermal resistant PETG and PEN, and Example 3 in which the optical film is manufactured by alternately laminating normal PETG and PEN. Also, a relatively good dimensional stress was shown to be maintained for Comparative example 1 using only the PEN resin, Comparative example 2 using only the high thermal resistant PETG resin, and Comparative example 3 using only the normal PETG resin.

But, since 90° C. is similar to the glass transfer temperature of the normal PETG, when measuring the dimensional stress at 90° C., as the case of the Examples 1, 2, and 4 showed a more lower dimensional stress than the Example 3, heat resistance in the case of manufacturing the optical film by alternately laminating the high thermal resistant PETG with PEN was observed to be excellent than laminating the normal PETG. Also, in the case of Comparative examples in which films were manufactured with individual resins, the dimensional stress was measured to be higher compared to the Examples.

The invention claimed is:

1. A multilayer optical film having a structure in which a first resin layer and a second resin layer are alternately laminated,
   wherein the first resin layer comprises a crystalline naphthalene dicarboxylic-acid polyester and the second resin layer comprises polyethylene terephthalate glycol (PETG),
   wherein the crystalline naphthalene dicarboxylic-acid polyester of the first resin layer is polyethylenenaphthalate (PEN) manufactured by polycondensation of naphthalatedicarboxylic-acid and ethyleneglycol,
   wherein a glass transfer temperature of the second resin layer is 100 to 140° C., and
   wherein the PETG of the second resin layer comprises an amount of cyclohexanedimethanol (CHDM) of 60% to 70%.

2. A multilayer optical film according to claim 1, wherein a refractive index difference of the first resin layer and the second resin layer is 0.05 to 0.2.

3. A multilayer optical film according to claim 1, wherein the PETG of the second resin layer comprises a component manufactured from ethylene glycol (EG), 1,4-cyclohexanedimethanol (CHDM), and terephthalic acid (TPA).

4. A multilayer optical film according to claim 1, wherein the PETG of the second resin layer comprises a compound represented by the formulae:

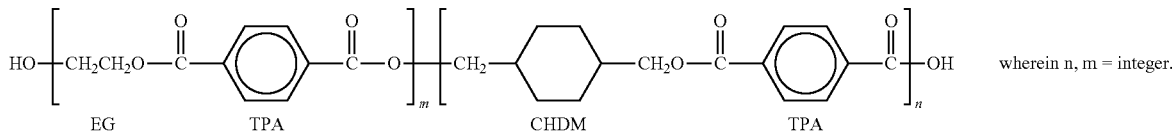

wherein n, m = integer.

5. A multilayer optical film according to claim 1, wherein the first resin layer and the second resin layer have thicknesses from 100 to 500 nm.

6. A multilayer optical film according to claim 1, wherein the first resin layer and the second resin layer have thicknesses from 200 to 300 nm.

7. A method for manufacturing a multilayer optical film comprising the step of:
   (a) melting extrusion a first resin comprising a crystalline naphthalene dicarboxylic-acid polyester and a second resin comprising PETG respectively and then alternately laminating the first resin and the second resin; and
   (b) elongating the laminated sheet in the step (a) and then thermosetting the laminated sheet,
   wherein the crystalline naphthalene dicarboxylic-acid polyester of the first resin is polyethylenenaphthalate (PEN) manufactured by polycondensation of naphthalatedicarboxylic-acid and ethyleneglycol, wherein a glass transfer temperature of the second resin is 100 to 140° C., wherein the PETG of the second resin comprises an amount of cyclohexanedimethanol (CHDM) of 60% to 70% wherein laminated sheet in the step (b) is elongated in at least one direction among a longitudinal direction or a vertical direction, and wherein a temperature of the melted extrusion is 280 to 300° C.

8. A method for manufacturing a multilayer optical film according to claim 7, after elongating process in the step (b), wherein a refractive index difference of the first resin layer and the second resin layer in an elongation direction is greater than a refraction difference of the first resin layer and the second resin layer in a non-elongation direction.

9. A method for manufacturing a multilayer optical film according to claim 8, wherein the refractive index difference of the first resin layer and the second resin layer in the elongation direction is 0.3 or more.

10. A method for manufacturing a multilayer optical film according to claim 7, wherein a temperature of the elongated in the longitudinal direction and the vertical direction is 150 to 180° C.

11. A method for manufacturing a multilayer optical film according to claim 7, wherein a temperature of the elongation in the longitudinal direction and the vertical direction is a glass transfer temperature (Tg) of the PETG +30° C. or less.

12. A method for manufacturing a multilayer optical film according to claim 7, wherein a temperature of the elongation in the longitudinal direction and the vertical direction is a glass transfer temperature (Tg) of the PETG +10° C. or less.

* * * * *